(12) United States Patent
Tan et al.

(10) Patent No.: US 11,085,858 B1
(45) Date of Patent: Aug. 10, 2021

(54) TRUE TRIAXIAL TESTER WITH ADJUSTABLE LOADING STIFFNESS AND TEST METHOD

(71) Applicant: SHANDONG UNIVERSITY OF SCIENCE AND TECHNOLOGY, Qingdao (CN)

(72) Inventors: Yunliang Tan, Qingdao (CN); Yanchun Yin, Qingdao (CN); Tongbin Zhao, Qingdao (CN); Yubao Zhang, Qingdao (CN); Weiyao Guo, Qingdao (CN); Xingxue Tang, Qingdao (CN); Hongjie Zhou, Qingdao (CN)

( * ) Notice: Subject to any disclaimer, the term of this patent is extended or adjusted under 35 U.S.C. 154(b) by 0 days.

(21) Appl. No.: 17/222,405

(22) Filed: Apr. 5, 2021

Related U.S. Application Data (63) Continuation of application No. PCT/CN2019/104836, filed on Sep. 9, 2019.

(30) Foreign Application Priority Data

Apr. 12, 2019 (CN) .......................... 201910291704.1

(51) Int. Cl.
  *G01N 3/00* (2006.01)
  *G01N 3/06* (2006.01)
  *G01N 3/12* (2006.01)

(52) U.S. Cl.
  CPC ............... *G01N 3/066* (2013.01); *G01N 3/12* (2013.01); *G01N 2203/0019* (2013.01); *G01N 2203/0256* (2013.01)

(58) Field of Classification Search
  CPC .. G01N 3/066; G01N 3/12; G01N 2203/0019; G01N 2203/0256
  See application file for complete search history.

(56) References Cited

U.S. PATENT DOCUMENTS 3,952,572 A * 4/1976 Mergler .................. B21D 7/02
                                                    72/298
4,478,086 A * 10/1984 Gram ....................... G01N 3/08
                                                    73/781

(Continued)

FOREIGN PATENT DOCUMENTS

CN          201277925 Y     7/2009
CN          102435503 A     5/2012

(Continued)

OTHER PUBLICATIONS

International Search Report and Writen Opinion of PCT/CN2019/104836 dated Dec. 31, 2019.

(Continued)

*Primary Examiner* — Max H Noori
(74) *Attorney, Agent, or Firm* — W&K IP (57) ABSTRACT

The present disclosure provides a true triaxial tester with adjustable loading stiffness and a test method, relating to the technical field of rock mechanics. The tester includes a first principal stress variable stiffness loading apparatus, a second principal stress variable stiffness loading apparatus, a third principal stress loading apparatus, a monitoring system, and a control system. The monitoring system includes a stiffness sensor, a pressure sensor, and a displacement sensor. Loading stiffness in a first principal stress direction and a second principal stress direction is adjustable. The tester has the following advantages: it has fixed loading stiffness, can complete stiffness loading of one side being free and five sides being variable, and is easy to operate.

6 Claims, 4 Drawing Sheets

(56) References Cited

U.S. PATENT DOCUMENTS

| | | | | |
|---|---|---|---|---|
| 4,502,338 A * | 3/1985 | Smith | ............... | G01N 3/08 |
| | | | | 73/819 |
| 4,679,441 A * | 7/1987 | Johnson | ............... | G01N 3/10 |
| | | | | 73/798 |
| 5,435,187 A * | 7/1995 | Ewy | ............... | G01N 3/10 |
| | | | | 73/38 |
| 5,777,219 A * | 7/1998 | Popio | ............... | G01M 17/027 |
| | | | | 356/71 |
| 2014/0007309 A1* | 1/2014 | Plodinec | ............... | G01Q 60/366 |
| | | | | 850/40 |
| 2015/0168282 A1 | 6/2015 | He et al. | | |
| 2018/0335494 A1* | 11/2018 | Hakimuddin | ............... | G01N 24/081 |
| 2019/0033198 A1 | 1/2019 | Atapour et al. | | |
| 2019/0265138 A1* | 8/2019 | Ma | ............... | G01N 3/10 |

FOREIGN PATENT DOCUMENTS

| | | |
|---|---|---|
| CN | 103969107 A | 8/2014 |
| CN | 106198264 A | 12/2016 |
| CN | 205910055 U | 1/2017 |
| CN | 109269902 A | 1/2019 |

OTHER PUBLICATIONS

Notification to Grant Patent Right for Invention of CN201910291704.1 dated Dec. 24, 2019.
Office Action of CN201910291704.1 dated Nov. 25, 2019.

* cited by examiner

TRUE TRIAXIAL TESTER WITH ADJUSTABLE LOADING STIFFNESS AND TEST METHOD

CROSS-REFERENCE TO RELATED APPLICATIONS

This application is a continuation of International Application No. PCT/CN2019/104836 with a filing date of Sep. 9, 2019, designating the United states, now pending, and further claims to the benefit of priority from Chinese Application No. 201910291704.1 with a filing date of Apr. 12, 2019. The content of the aforementioned applications, including any intervening amendments thereto, are incorporated herein by reference.

TECHNICAL FIELD

The present disclosure relates to the technical field of rock mechanics, in particular to a true triaxial tester with adjustable loading stiffness, and further to a method for adjusting loading stiffness by a tester and a method for conducting a test using the tester.

BACKGROUND

Mechanical property testing of rock is an important research content of rock mass engineering such as mine. In view of the fact that rock in underground engineering is generally in a three-dimensional stress state, true triaxial tests of rock have attracted the attention of many scholars. Different types of existing true triaxial testers, such as a true triaxial seepage tester that studies a stress-seepage coupling field, a true triaxial loading and unloading tester that studies characteristics of rock unloading and instability, and a true triaxial disturbance tester that simulates a phenomenon of rock burst under dynamic-static load superposition, provide convenience for revealing rock mechanical properties under different stress conditions.

For rock in underground engineering environments, a loader and a carrier are mostly rock with different lithology. Due to the different lithology, stiffness of the loader is also constantly changing. Loading stiffness of existing true triaxial testers is mostly constant, which cannot well simulate stress loading boundary conditions of rock under different lithologic conditions. This has some limitations for deeply revealing deformation and instability characteristics of the rock in the underground engineering environments. In addition, the existing true triaxial testers mostly loading six sides in three directions. However, surrounding rock of a deep roadway is in a state of one side free and five sides loaded. Therefore, it is necessary to further improve the existing true triaxial testers to study mechanical properties of roadway surrounding rock by testers.

SUMMARY OF THE INVENTION

To solve the technical problem that the existing true triaxial testers are inconvenient to adjust the loading stiffness and cannot simulate the force of roadway surrounding rock, the present disclosure provides a true triaxial tester with adjustable loading stiffness and a test method. Specific technical solutions are as follows.

A true triaxial tester with adjustable loading stiffness includes a first principal stress variable stiffness loading apparatus, a second principal stress variable stiffness loading apparatus, a third principal stress loading apparatus, a monitoring system, and a control system.

The first principal stress variable stiffness loading apparatus comprises an outer frame, an inner top beam, a first inner column, a first stiffness adjusting cylinder, a first loading cylinder, and a first pressure bearing column, the first stiffness adjusting cylinder is disposed at the top of the outer frame, the inner top beam is disposed below the first stiffness adjusting cylinder, a lower end of the first stiffness adjusting cylinder is provided with a short pressure bearing column, a lower end of the short pressure bearing column is in contact with the inner top beam, the first pressure bearing column is disposed below the inner top beam, the first loading cylinder is disposed at the bottom of the outer frame, and the first inner column is connected to the inner top beam and the bottom of the outer frame.

The second principal stress variable stiffness loading apparatus comprises an inner side plate, an inner transverse column, a second stiffness adjusting cylinder, a second loading cylinder, and a second pressure bearing column, left and right sides of the second principal stress variable stiffness loading apparatus are arranged symmetrically, the second loading cylinder is connected to the inner side plate, the inner transverse column is connected between the inner side plates, and the inner side plate is further provided with the second pressure bearing column.

The third principal stress loading apparatus comprises a third loading cylinder and a third pressure bearing column, the third loading cylinder is disposed on a rear side of the outer frame, and the third loading cylinder is connected to the third pressure bearing column.

Preferably, a lower end of the inner side plate is provided with a pulley, the fixed base is disposed at the bottom of the outer frame, and the fixed base is further provided with a pulley guide rail.

Preferably, wherein stiffness of the inner top beam is greater than that of the first inner column, and stiffness of the inner side plate is greater than that of the inner transverse column.

Preferably, the monitoring system includes a first stiffness sensor, a second stiffness sensor, a first pressure sensor, a second pressure sensor, a third pressure sensor, a first displacement sensor, and a second displacement sensor, the first stiffness sensor is disposed between the first stiffness adjusting cylinder and the inner top beam, the first pressure sensor is disposed between the inner top beam and the first pressure bearing column, and the first displacement sensor is disposed between the inner top beam and a fixed base.

Preferably, the second stiffness sensor is disposed between the second stiffness adjusting cylinder and the inner side plate, the second pressure sensor is disposed between the second loading cylinder and the second pressure bearing column, and the second displacement sensor is disposed between the inner side plates; the third pressure sensor is disposed between the third loading cylinder and the third pressure bearing column.

Further preferably, the monitoring system transmits monitoring information to a control system, and the first stiffness adjusting cylinder, the first loading cylinder, the second stiffness adjusting cylinder, the second loading cylinder, and the third loading cylinder are controlled by the control system.

A stiffness adjusting method for a true triaxial tester with adjustable loading stiffness using the above-mentioned true triaxial tester with adjustable loading stiffness, which specifically includes the following operations:

Stiffness adjustment in a first principal stress loading direction: the first loading cylinder loads a specimen, the inner top beam drives the first inner column to stretch, making the first inner column elastically deform, the first pressure sensor feeds monitoring data back to the control system, and the control system controls the first stiffness adjusting cylinder to load or unload and then adjusts the displacement of the inner top beam and the deformation of the first inner column; and Stiffness adjustment in a second principal stress loading direction: the second loading cylinder loads a specimen, the inner side plate drives the inner transverse column to stretch, making the inner transverse column elastically deform, the second pressure sensor feeds monitoring data back to the control system, and the control system controls the second stiffness adjusting cylinder to load or unload and then adjusts the displacement of the inner side plate and the deformation of the inner transverse column.

Further more, stiffness adjustment in a first principal stress loading direction: the first loading cylinder loads a specimen, the inner top beam drives the first inner column to stretch, making the first inner column elastically deform, the first pressure sensor feeds monitoring data back to the control system, and the control system controls the first stiffness adjusting cylinder to load or unload and then adjusts the displacement of the inner top beam and the deformation of the first inner column; and Stiffness adjustment in a second principal stress loading direction: the second loading cylinder loads a specimen, the inner side plate drives the inner transverse column to stretch, making the inner transverse column elastically deform, the second pressure sensor feeds monitoring data back to the control system, and the control system controls the second stiffness adjusting cylinder to load or unload and then adjusts the displacement of the inner side plate and the deformation of the inner transverse column.

A true triaxial test method with adjustable loading stiffness using the above-mentioned true triaxial tester with adjustable loading stiffness, which includes the following steps:

Step 1: determining loading stiffness in a first principal stress direction and loading stiffness in a second principal stress direction, and calculating and determining a function relationship between a load value in the first principal stress direction and a displacement value in the first principal stress direction, and a function relationship between a load value in the second principal stress direction and a displacement value in the second principal stress direction;

Step 2: placing a rock specimen, and loading the rock specimen through the first loading cylinder, the second loading cylinder, and the third loading cylinder; and Step 3: feeding, by the monitoring system, monitoring data back to the control system, controlling, by the control system, the first stiffness adjusting cylinder and the second stiffness adjusting cylinder to load or unload to satisfy the function relationship between the load value in the first principal stress direction and the displacement value in the first principal stress direction and the function relationship between the load value in the second principal stress direction and the displacement value in the second principal stress direction, and ending a test till instable failure of the rock specimen.

The present disclosure has the following advantageous effects.

(1) The true triaxial tester with adjustable loading stiffness provided in the present disclosure adjusts the loading stiffness in the first principal stress direction and the second principal stress direction through the first principal stress variable stiffness loading apparatus and the second principal stress variable stiffness loading apparatus, and the monitoring system monitors, in real time, load and displacement in the first principal stress direction and the second principal stress direction during loading, so that the stiffness can be adjusted in real time to ensure that the stiffness remains unchanged during the loading.

(2) The tester is further provided with a first loading cylinder, a second loading cylinder, and a third loading cylinder, so that five sides of a rock specimen in three directions can be loaded, one of which faces is free, and then failure characteristics of roadway surrounding rock can be simulated. The inner side plate and the inner top beam are made of high-stiffness materials to ensure the effective transmission of the loading force. The first inner column and the inner transverse column are made of low-stiffness materials to ensure reasonable control over the displacement during stiffness adjustment.

(3) The stiffness adjustment method uses the function relationship between the load value in the first principal stress direction and the displacement value in the first principal stress direction and the function relationship between the load value in the second principal stress direction and the displacement value in the second principal stress direction, so as to adjust the loading stiffness by controlling a ratio of the load and the displacement in the two directions. The whole process combines real-time feedback data of the monitoring system and automatic adjustment of the control system to achieve automatic adjustment of stiffness during the test.

(4) The rock specimen is loaded by using the true triaxial tester, the loading stiffness of the rock specimen can be adjusted during the loading according to a test plan and a test purpose, and the adjustment is convenient. The test is more in line with stress characteristics of the roadway surrounding rock, and is of great significance to the study of the mechanical properties of the surrounding rock.

Reference numerals in the drawings are as follows: 1. outer frame; 2. inner top beam; 3. first inner column; 4. first stiffness adjusting cylinder; 5. first loading cylinder; 6. first pressure bearing column; 7. inner side plate; 8. inner transverse column; 9. second stiffness adjusting cylinder; 10. second loading cylinder; 11. second pressure bearing column; 12. first stiffness sensor; 13. second stiffness sensor; 14. first pressure sensor; 15. second pressure sensor; 16. third pressure sensor; 17. first displacement sensor; 18. second displacement sensor; 19. third loading cylinder; 20. third pressure bearing column; 21. short pressure bearing column; 22. pulley; 23 pulley guide rail; 24. fixed base.

DETAILED DESCRIPTION OF PREFERRED EMBODIMENTS

As shown in FIGS. 1 to 4, the present disclosure provides a true triaxial tester with adjustable loading stiffness and a test method, of which specific implementations are as follows.

Figure 1:
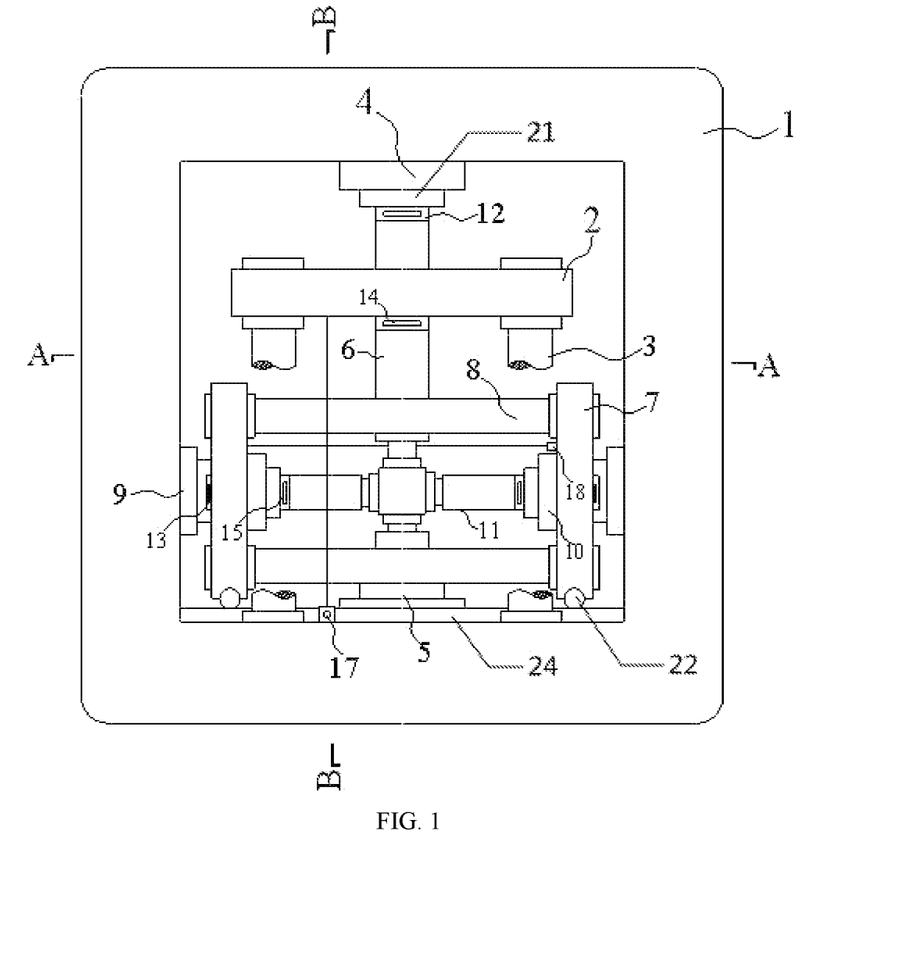
FIG. 1 is a schematic partial structural diagram of a true triaxial tester with adjustable loading stiffness.
Figure 2:
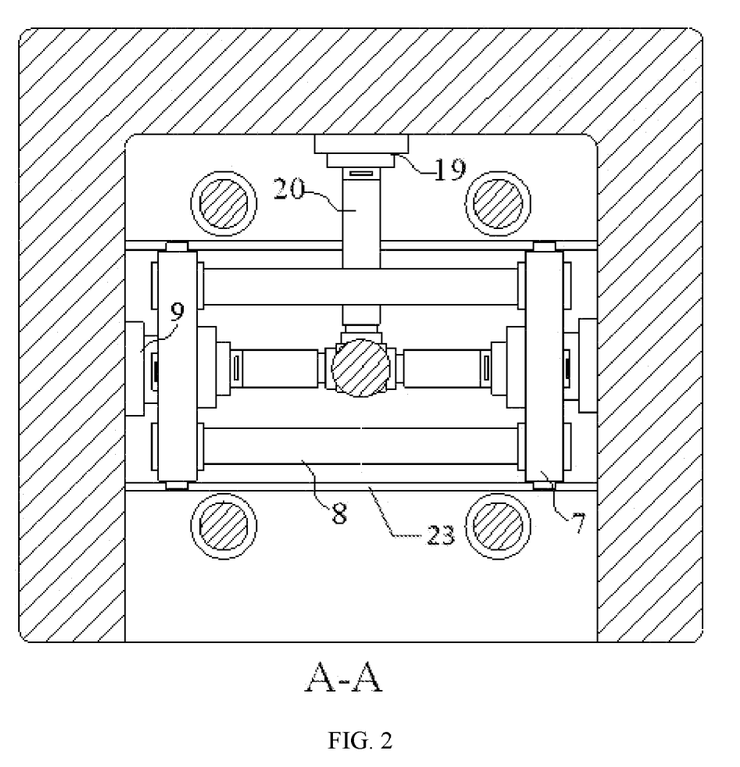
FIG. 2 is a schematic diagram of an A-A cross section of FIG. 1.
Figure 3:
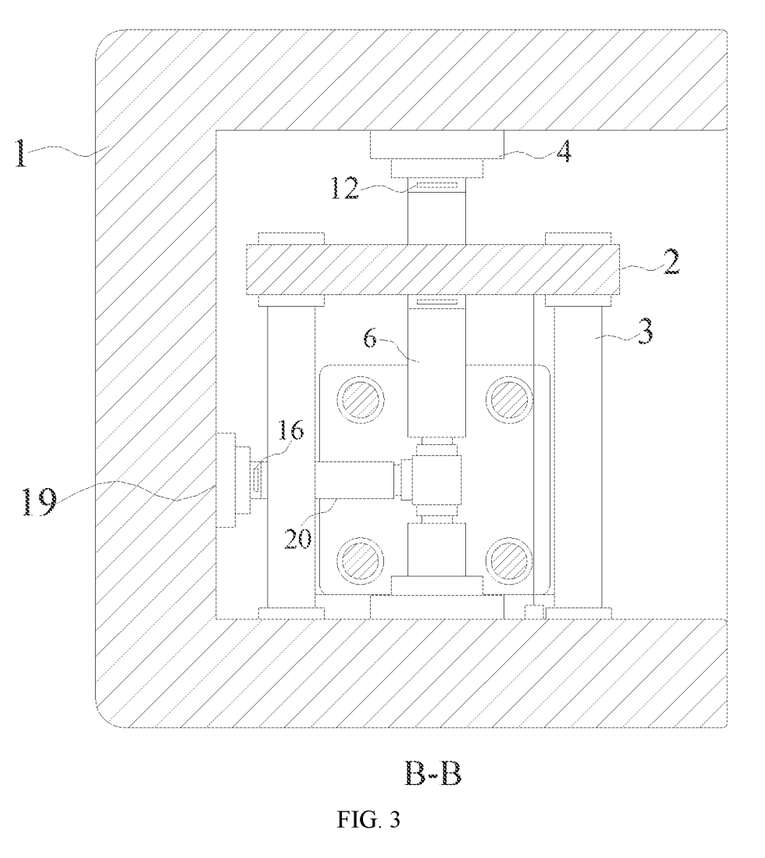
FIG. 3 is a schematic diagram of a B-B cross section of FIG. 1.
Figure 4:
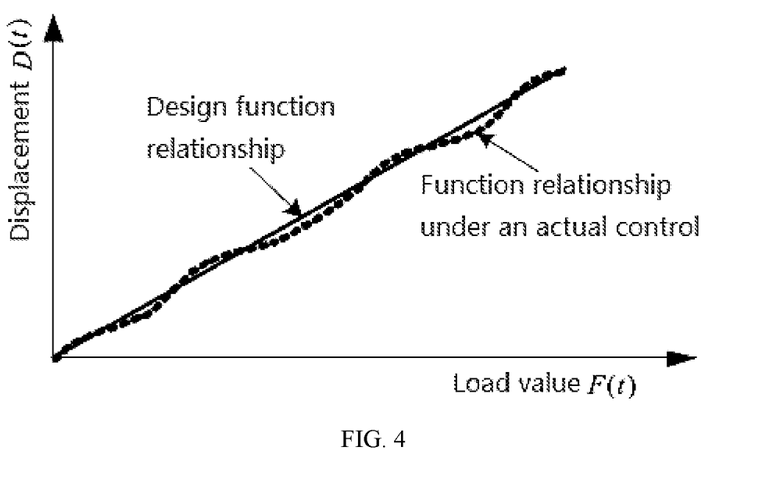
FIG. 4 is a schematic diagram of a function relationship between load and displacement.

A true triaxial tester with adjustable loading stiffness specifically includes a first principal stress variable stiffness loading apparatus, a second principal stress variable stiffness loading apparatus, a third principal stress loading apparatus, a monitoring system, and a control system. The tester realizes loading in three directions: a first principal stress direction, a second principal stress direction, and a third principal stress direction. Only one side of a rock specimen is loaded in the third principal stress direction, so that actual stress on roadway surrounding rock with one side free and fives sides loaded can be simulated. Stiffness adjustment of the tester in the first principal stress direction and the second principal stress direction is realized through the first principal stress variable stiffness loading apparatus and the second principal stress variable stiffness loading apparatus. The monitoring system monitors, in real time, load and displacement in the first principal stress direction and the second principal stress direction during loading, the monitoring system feeds monitoring data back to the control system, and the control system controls the loading of the first stiffness adjusting cylinder and the second stiffness adjusting cylinder, so that the stiffness can be adjusted in real time.

The first principal stress variable stiffness loading apparatus specifically includes an outer frame 1, an inner top beam 2, a first inner column 3, a first stiffness adjusting cylinder 4, a first loading cylinder 5, and a first pressure bearing column 6. The first stiffness adjusting cylinder 4 is disposed at the top of the outer frame 1. The cylinder is loaded upside down. The inner top beam 2 is disposed below the first stiffness adjusting cylinder 4. The inner top beam 2 is made of a high-stiffness material to ensure that the inner top beam 2 does not deform when subjected to a load or the deformation is negligible. A lower end of the first stiffness adjusting cylinder 4 is provided with a short pressure bearing column 21 to facilitate loading and transfer of force. A lower end of the short pressure bearing column is in contact with the inner top beam 2 to facilitate disassembly and assembly and ensure reasonable displacement and deformation. The first pressure bearing column 6 is disposed below the inner top beam 2, and a lower part of the first pressure bearing column 6 is in contact with a rock specimen. The first loading cylinder 5 is disposed at the bottom of the outer frame 1. The first inner column 3 is connected to the inner top beam 2 and the bottom of the outer frame 1. The first inner column 3 is made of an elastic material, a memory metal material or an elastic rod. The first inner column 3 has the capability to quickly recover after deformation, so large deformation under load can be ensured, and the deformation conforms to Hooke's law and guarantees the effectiveness of loading stiffness adjustment.

The second principal stress variable stiffness loading apparatus specifically includes an inner side plate 7, an inner transverse column 8, a second stiffness adjusting cylinder 9, a second loading cylinder 10, and a second pressure bearing column 11. Left and right sides of the second principal stress variable stiffness loading apparatus are arranged symmetrically. The second stiffness adjusting cylinder 9 is connected to the outer frame 1. The second stiffness adjusting cylinder 9 is used for stiffness adjustment in the second principal stress direction, and the second loading cylinder 10 is used for loading stress load in the second principal stress direction. The second stiffness adjusting cylinder 9 is connected to the outer frame 1. Specifically, an indenter of the second stiffness adjusting cylinder 9 is in contact with the inner side plate 7. The inner side plate 7 is square or rectangular, which is specifically designed according to a requirement of a testing device. The second loading cylinder 10 is connected to the inner side plate 7. The inner transverse column 8 is connected between the inner side plates 7. The inner side plate 7 is further provided with the second pressure bearing column 11. The inner side plate 7 pressurizes the rock specimen through the pressure bearing column.

The third principal stress loading apparatus includes a third loading cylinder 19 and a third pressure bearing column 20. The third loading cylinder 19 is disposed at a rear side of the outer frame 1. The outer frame 1 is a box structure with an open front, and the third loading cylinder 19 is connected to the third pressure bearing column 20 to pressurize the rock specimen through the third pressure bearing column 20. In addition, a lower end of the inner side plate 7 is provided with a pulley 22. A fixed base 24 may be disposed at the bottom of the outer frame 1. The fixed base 24 is further provided with a pulley guide rail 23, so as to fix the inner side plate and facilitate the displacement of the inner side plate during the loading to adjust the loading stiffness.

The stiffness of the inner top beam 2 is much greater than that of the first inner column 3. The inner top beam 2 is made of a high-stiffness material, and its stiffness is greater than 10 N/m, so as to ensure that the inner top beam 2 drives the first inner column 3 to deform. The deformation of the inner top beam 2 is negligible. The stiffness of the inner side plate 7 is much greater than that of the inner transverse column 8. The inner side plate 7 is made of a high-stiffness material, and its stiffness is greater than 10 N/m, so as to ensure that the inner side plate 7 drives the inner transverse column 8 to deform. The stiffness of the inner side plate 7 is negligible.

The monitoring system includes a first stiffness sensor 12, a second stiffness sensor 13, a first pressure sensor 14, a second pressure sensor 15, a third pressure sensor 16, a first displacement sensor 17, and a second displacement sensor 18. The first stiffness sensor 12 is disposed between the first stiffness adjusting cylinder 4 and the inner top beam 2. The first stiffness sensor 12 is used for monitoring the magnitude of a load applied by the first stiffness adjusting cylinder. The first pressure sensor 14 is disposed between the inner top beam 2 and the first pressure bearing column 6. The first pressure sensor 14 is used for monitoring and recording the magnitude of a load applied by the first loading cylinder 5 to the rock specimen in the first principal stress direction. The first displacement sensor 17 is disposed between the inner top beam 2 and the fixed base 24, for monitoring the deformation of the first inner column in the first principal stress direction and the displacement of the inner top beam. The second stiffness sensor 13 is disposed between the second stiffness adjusting cylinder 9 and the inner side plate 7, for monitoring the magnitude of a load applied by the second stiffness adjusting cylinder 9. The second pressure sensor 15 is disposed between the second loading cylinder 10 and the second pressure bearing column 11, for monitoring the magnitude of a load applied by the second loading cylinder 10 to the rock specimen in the second principal stress direction. The second displacement sensor 18 is disposed between the inner side plates 7 on left and right sides, for monitoring the displacement of the inner side plate and elastic deformation of the inner transverse column 8. The third pressure sensor 16 is disposed between the third loading cylinder 19 and the third pressure bearing column 20, for monitoring the magnitude of a load in the third principal stress direction.

The monitoring system transmits monitoring information to the control system. The control system processes feedback information of the monitoring system and controls the operation of the cylinder. The first stiffness adjusting cylinder 4, the first loading cylinder 5, the second stiffness adjusting cylinder 9, the second loading cylinder 10, and the third loading cylinder 19 are controlled by the control system to load the rock specimen or adjust the loading stiffness in the first principal stress direction and the second principal stress direction.

A stiffness adjusting method for a true triaxial tester with adjustable loading stiffness using the true triaxial tester with adjustable loading stiffness specifically includes the following steps:

(1) Stiffness adjustment in a first principal stress loading direction: firstly, the control system controls the first loading cylinder to load a specimen, then, the inner top beam drives the first inner column to stretch, making the first inner column elastically deform, the first pressure sensor feeds monitoring data back to the control system, and the control system makes adjustment according to a function relationship between a load value measured by the first pressure sensor and a displacement value in the first principal stress direction. The control system controls the first stiffness adjusting cylinder to load or unload and then adjusts the displacement of the inner top beam and the deformation of the first inner column to suitable loading stiffness.

(2) Stiffness adjustment in a second principal stress loading direction: firstly, the control system controls the second loading cylinder to load a specimen, then, the inner top beam drives the inner transverse column to stretch, making the inner transverse column elastically deform, the second pressure sensor feeds monitoring data back to the control system, and the control system makes adjustment according to a function relationship between a load value in the second principal stress direction and a displacement value in the second principal stress direction. The control system controls the second stiffness adjusting cylinder to load or unload and then adjusts the displacement of the inner side plate and the deformation of the inner transverse column to suitable loading stiffness.

In the process of the first loading cylinder loading the specimen, the control system controls the first stiffness adjusting cylinder to load or unload specifically as follows: keeping a ratio of a load value measured by the first pressure sensor to a displacement value measured by the first displacement sensor in the first principal stress direction to a set value, and when the ratio of the load value measured by the first pressure sensor to the displacement value in the first principal stress direction is greater than the set value, the first stiffness adjusting cylinder unloading, so as to reduce the load of the stiffness adjusting cylinder and increase the displacement in the first principal stress direction; and when the ratio of the load value measured by the first pressure sensor to the displacement value in the first principal stress direction is less than the set value, the first stiffness adjusting cylinder loading, so as to increase the load of the stiffness adjusting cylinder and reduce the displacement in the first principal stress direction, to ensure stability of the loading stiffness in the first principal stress direction.

In the process of the second loading cylinder loading the specimen, the control system controls the second stiffness adjusting cylinder to load or unload specifically as follows: keeping a ratio of a load value measured by the second pressure sensor to a displacement value measured by the second displacement sensor in the second principal stress direction to a set value, and when the ratio of the load value measured by the second pressure sensor to the displacement value in the second principal stress direction is greater than the set value, the second stiffness adjusting cylinder unloading, so as to reduce the load of the second stiffness adjusting cylinder and increase the displacement in the second principal stress direction; and when the ratio of the load value measured by the second pressure sensor to the displacement value in the second principal stress direction is less than the set value, the second stiffness adjusting cylinder loading, so as to increase the load of the second stiffness adjusting cylinder and reduce the displacement in the second principal stress direction, to ensure stability of the loading stiffness in the second principal stress direction.

The stiffness adjustment method uses the function relationship between the load value in the first principal stress direction and the displacement value in the first principal stress direction and the function relationship between the load value in the second principal stress direction and the displacement value in the second principal stress direction, so as to adjust the loading stiffness by controlling a ratio of the load and the displacement in the two directions. The whole process combines real-time feedback data of the monitoring system and automatic adjustment of the control system to achieve automatic adjustment of stiffness during the test.

A true triaxial test method with adjustable loading stiffness using the true triaxial tester with adjustable loading stiffness includes the following steps:

Step 1: Loading stiffness in a first principal stress direction and loading stiffness in a second principal stress direction is determined, and a function relationship between a load value in the first principal stress direction and a displacement value in the first principal stress direction and a function relationship between a load value in the second principal stress direction and a displacement value in the second principal stress direction are calculated and determined. The function relationship in the first principal stress direction and the function relationship in the second principal stress are determined by stiffness coefficients of the first inner column and the inner transverse column. The function relationship in the first principal stress direction and the function relationship in the second principal stress may be the same or different.

Step 2: A rock specimen is placed, and the rock specimen is loaded through the first loading cylinder, the second loading cylinder, and the third loading cylinder according to a test purpose. The loading stiffness is controlled during the loading, and a specific loading stiffness adjustment principle is the same as the loading stiffness method for the true triaxial tester with adjustable loading stiffness.

Step 3: The monitoring system feeds monitoring data back to the control system, the control system controls the first stiffness adjusting cylinder and the second stiffness adjusting cylinder to load or unload to satisfy the function relationship between the load value in the first principal stress direction and the displacement value in the first principal stress direction and the function relationship between the load value in the second principal stress direction and the displacement value in the second principal stress direction, during actual adjustment, when actual data monitored by the monitoring system does not satisfy a set function relationship, controlling, by the control system, the stiffness adjusting cylinder to adjust the stiffness of the apparatus to make the stiffness in the first principal stress direction and the second principal stress direction always satisfy the set function relations, so as to ensure constant stiffness, and a test is ended till instable failure of the rock specimen.

The rock specimen is loaded by using the true triaxial tester, the loading stiffness of the rock specimen can be adjusted during the loading according to a test plan and a test purpose, and the adjustment is convenient. The test is more in line with stress characteristics of the roadway surrounding rock, and is of great significance to the study of the mechanical properties of the surrounding rock.

It should be appreciated that the foregoing is only preferred embodiments of the invention and is not for use in limiting the invention. Although this invention is described in detail based on the foregoing preferred embodiments, it is apparent for those skilled in the art that modification of technical proposals or equivalent substitution of part or all of the technical features can be made. Any modification, equivalent substitution, and improvement without departing from the spirit and principle of this invention should be covered in the protection scope of the invention.

What is claimed is:

1. A true triaxial tester with adjustable loading stiffness, comprising a first principal stress variable stiffness loading apparatus, a second principal stress variable stiffness loading apparatus, a third principal stress loading apparatus, a monitoring system, and a control system;
    wherein the first principal stress variable stiffness loading apparatus comprises an outer frame, an inner top beam, a first inner column, a first stiffness adjusting cylinder, a first loading cylinder, and a first pressure bearing column, the first stiffness adjusting cylinder is disposed at the top of the outer frame, the inner top beam is disposed below the first stiffness adjusting cylinder, a lower end of the first stiffness adjusting cylinder is provided with a short pressure bearing column, a lower end of the short pressure bearing column is in contact with the inner top beam, the first pressure bearing column is disposed below the inner top beam, the first loading cylinder is disposed at the bottom of the outer frame, and the first inner column is connected to the inner top beam and the bottom of the outer frame;
    the second principal stress variable stiffness loading apparatus comprises an inner side plate, an inner transverse column, a second stiffness adjusting cylinder, a second loading cylinder, and a second pressure bearing column, left and right sides of the second principal stress variable stiffness loading apparatus are arranged symmetrically, the second loading cylinder is connected to the inner side plate, the inner transverse column is connected between the inner side plates, and the inner side plate is further provided with the second pressure bearing column;
    the third principal stress loading apparatus comprises a third loading cylinder and a third pressure bearing column, the third loading cylinder is disposed on a rear side of the outer frame, and the third loading cylinder is connected to the third pressure bearing column;
    the monitoring system comprises a first stiffness sensor, a second stiffness sensor, a first pressure sensor, a second pressure sensor, a third pressure sensor, a first displacement sensor, and a second displacement sensor, the first stiffness sensor is disposed between the first stiffness adjusting cylinder and the inner top beam, the first pressure sensor is disposed between the inner top beam and the first pressure bearing column, and the first displacement sensor is disposed between the inner top beam and a fixed base;
    the second stiffness sensor is disposed between the second stiffness adjusting cylinder and the inner side plate, the second pressure sensor is disposed between the second loading cylinder and the second pressure bearing column, and the second displacement sensor is disposed between the inner side plates; the third pressure sensor is disposed between the third loading cylinder and the third pressure bearing column; and
    the monitoring system transmits monitoring information to a control system, and the first stiffness adjusting cylinder, the first loading cylinder, the second stiffness adjusting cylinder, the second loading cylinder, and the third loading cylinder are controlled by the control system.

2. The true triaxial tester with adjustable loading stiffness according to claim 1, wherein a lower end of the inner side plate is provided with a pulley, the fixed base is disposed at the bottom of the outer frame, and the fixed base is further provided with a pulley guide rail.

3. The true triaxial tester with adjustable loading stiffness according to claim 1, wherein stiffness of the inner top beam is greater than that of the first inner column, and stiffness of the inner side plate is greater than that of the inner transverse column.

4. A stiffness adjusting method for a true triaxial tester with adjustable loading stiffness using the true triaxial tester with adjustable loading stiffness according to claim 1, wherein loading stiffness adjustment comprises:
    stiffness adjustment in a first principal stress loading direction: the first loading cylinder loads a specimen, the inner top beam drives the first inner column to stretch, making the first inner column elastically deform, the first pressure sensor feeds monitoring data back to the control system, and the control system controls the first stiffness adjusting cylinder to load or unload and then adjusts the displacement of the inner top beam and the deformation of the first inner column; and
    stiffness adjustment in a second principal stress loading direction: the second loading cylinder loads a specimen, the inner side plate drives the inner transverse column to stretch, making the inner transverse column elastically deform, the second pressure sensor feeds monitoring data back to the control system, and the control system controls the second stiffness adjusting cylinder to load or unload and then adjusts the displacement of the inner side plate and the deformation of the inner transverse column.

5. The stiffness adjusting method for a true triaxial tester with adjustable loading stiffness according to claim 4, wherein in the process of the first loading cylinder loading the specimen, the control system controls the first stiffness adjusting cylinder to load or unload specifically as follows: keeping a ratio of a load value measured by the first pressure sensor to a displacement value measured by the first displacement sensor in the first principal stress direction to a set value, and when the ratio of the load value measured by the first pressure sensor to the displacement value in the first principal stress direction is greater than the set value, the first stiffness adjusting cylinder unloading; and when the ratio of the load value measured by the first pressure sensor to the displacement value in the first principal stress direction is less than the set value, the first stiffness adjusting cylinder loading;
    in the process of the second loading cylinder loading the specimen, the control system controls the second stiffness adjusting cylinder to load or unload specifically as follows: keeping a ratio of a load value measured by the second pressure sensor to a displacement value measured by the second displacement sensor in the second principal stress direction to a set value, and when the ratio of the load value measured by the second pressure sensor to the displacement value in the second principal stress direction is greater than the set value, the second stiffness adjusting cylinder unloading; and when the ratio of the load value measured by the second pressure sensor to the displacement value in the second principal stress direction is less than the set value, the second stiffness adjusting cylinder loading.

6. A true triaxial test method with adjustable loading stiffness using the true triaxial tester with adjustable loading stiffness according to claim 1, the method comprising:
  step 1: determining loading stiffness in a first principal stress direction and loading stiffness in a second principal stress direction, and calculating and determining a function relationship between a load value in the first principal stress direction and a displacement value in the first principal stress direction, and a function relationship between a load value in the second principal stress direction and a displacement value in the second principal stress direction;
  step 2: placing a rock specimen, and loading the rock specimen through the first loading cylinder, the second loading cylinder, and the third loading cylinder; and
  step 3: feeding, by the monitoring system, monitoring data back to the control system, controlling, by the control system, the first stiffness adjusting cylinder and the second stiffness adjusting cylinder to load or unload to satisfy the function relationship between the load value in the first principal stress direction and the displacement value in the first principal stress direction and the function relationship between the load value in the second principal stress direction and the displacement value in the second principal stress direction, and ending a test till instable failure of the rock specimen.

* * * * *